(12) United States Patent
Ferrar

(10) Patent No.: US 9,630,363 B2
(45) Date of Patent: Apr. 25, 2017

(54) SELECTIVE LASER SOLIDIFICATION APPARATUS AND METHOD

(71) Applicant: RENISHAW PLC, Wotton-under-Edge, Gloucestershire (GB)

(72) Inventor: Ben Ian Ferrar, Alsager (GB)

(73) Assignee: RENISHAW PLC, Wotton-under-Edge (GB)

( * ) Notice: Subject to any disclaimer, the term of this patent is extended or adjusted under 35 U.S.C. 154(b) by 545 days.

(21) Appl. No.: 14/179,021

(22) Filed: Feb. 12, 2014

(65) Prior Publication Data
US 2014/0271965 A1  Sep. 18, 2014

Related U.S. Application Data

(60) Provisional application No. 61/791,636, filed on Mar. 15, 2013.

(51) Int. Cl.
*B29C 67/00* (2006.01)
*B22F 3/10* (2006.01)
*B22F 3/105* (2006.01)

(52) U.S. Cl.
CPC ...... *B29C 67/0077* (2013.01); *B29C 67/0085* (2013.01); *B22F 3/101* (2013.01); *B22F 3/1055* (2013.01); *B22F 2003/1056* (2013.01); *B22F 2003/1057* (2013.01); *B22F 2003/1059* (2013.01); *B29C 67/0088* (2013.01)

(58) Field of Classification Search
CPC ............ B29C 67/0077; B29C 67/0085; B29C 67/0088; B22F 3/101; B22F 3/1055; B22F 2003/1056; B22F 2003/1057; B22F 2003/1059

USPC ................. 425/78, 174.4; 264/497
See application file for complete search history.

(56) References Cited

U.S. PATENT DOCUMENTS

| | | | |
|---|---|---|---|
| 5,017,317 A | 5/1991 | Marcus | |
| 5,155,324 A | 10/1992 | Deckard et al. | |
| 5,352,405 A | 10/1994 | Beaman et al. | |
| 5,534,104 A | 7/1996 | Langer et al. | |
| 5,730,925 A | 3/1998 | Mattes et al. | |

(Continued)

FOREIGN PATENT DOCUMENTS

| | | |
|---|---|---|
| CN | 101321600 A | 12/2008 |
| CN | 101842222 A | 9/2010 |

(Continued)

OTHER PUBLICATIONS

"Gas Flow Effects on Selective Laser Melting (SLM) Manufacturing Performance", B. Ferrar et al., Journal of Materials Processing Technology 212 (2012) 355-364, available online Oct. 2, 2011.*

(Continued)

*Primary Examiner* — Alison L Hindenlang
*Assistant Examiner* — Lawrence D Hohenbrink, Jr.
(74) *Attorney, Agent, or Firm* — Oliff PLC

(57) ABSTRACT

A selective laser solidification apparatus including: a powder bed onto which a powder layer can be deposited, a gas flow unit for passing a flow of gas over the powder bed along a gas flow direction, a laser scanning unit for scanning a laser beam over the powder layer to selectively solidify at least part of the powder layer to form at least one object and a processing unit for selecting a scanning sequence of the laser beam based on the gas flow direction.

16 Claims, 5 Drawing Sheets

(56) References Cited

U.S. PATENT DOCUMENTS

| | | | |
|---|---|---|---|
| 6,215,093 B1* | 4/2001 | Meiners | B22F 3/1055 219/121.61 |
| 6,583,379 B1 | 6/2003 | Meiners et al. | |
| 7,047,098 B2 | 5/2006 | Lindemann et al. | |
| 8,034,279 B2 | 10/2011 | Dimter et al. | |
| 2004/0099996 A1 | 5/2004 | Herzog | |
| 2005/0116391 A1 | 6/2005 | Lindemann et al. | |
| 2005/0142024 A1 | 6/2005 | Herzog | |
| 2008/0241392 A1* | 10/2008 | Dimter | B22F 3/1055 427/256 |
| 2009/0017220 A1 | 1/2009 | Muller et al. | |
| 2009/0266803 A1 | 10/2009 | Perret et al. | |
| 2009/0291308 A1 | 11/2009 | Pfister et al. | |
| 2011/0135840 A1 | 6/2011 | Doye et al. | |
| 2011/0285060 A1* | 11/2011 | Yamamoto | B29C 67/0077 264/401 |
| 2016/0114432 A1* | 4/2016 | Ferrar | B22F 3/1055 219/76.12 |

FOREIGN PATENT DOCUMENTS

| | | |
|---|---|---|
| CN | 101932429 A | 12/2010 |
| CN | 102574333 A | 7/2012 |
| CN | 102574333 B | 7/2015 |
| CN | 105500720 A | 4/2016 |
| DE | 19514740 C1 | 4/1996 |
| DE | 19649865 C1 | 2/1998 |
| DE | 19853947 C1 | 2/2000 |
| DE | 101 12 591 A1 | 10/2001 |
| DE | 100 42 134 A1 | 3/2002 |
| DE | 102 08 150 A1 | 9/2002 |
| DE | 10 2004 031881 A1 | 1/2006 |
| DE | 10 2004 041 633 A1 | 3/2006 |
| DE | 10 2006 014 835 A1 | 10/2007 |
| DE | 102007014683 A1 | 10/2008 |
| DE | 10 2010 052206 A1 | 5/2012 |
| EP | 0429196 A2 | 5/1991 |
| EP | 0590956 A1 | 4/1994 |
| EP | 1234625 A1 | 8/2002 |
| EP | 1419836 A1 | 5/2004 |
| EP | 2431113 A1 | 3/2012 |
| EP | 2492084 A1 | 8/2012 |
| GB | 2378151 A | 2/2003 |
| WO | 92/08592 A1 | 5/1992 |
| WO | 94/07681 A1 | 4/1994 |
| WO | 98/24574 A1 | 6/1998 |
| WO | 00/30785 A1 | 6/2000 |
| WO | 00/30789 A1 | 6/2000 |
| WO | 2008/116518 A1 | 10/2008 |
| WO | 2009/156316 A1 | 12/2009 |
| WO | WO 2010/007396 | 1/2010 |
| WO | 2014/125258 A2 | 8/2014 |
| WO | 2014/125280 A2 | 8/2014 |
| WO | 2014125281 A2 | 8/2014 |

OTHER PUBLICATIONS

Oct. 9, 2014 Written Opinion issued in International Patent Application No. PCT/GB2014/050418.

Oct. 9, 2014 International Search Report issued in International Patent Application No. PCT/GB2014/050418.

Aug. 28, 2014 International Search Report issued in International Patent Application No. PCT/GB2014/050417.

Aug. 28, 2014 Written Opinion issued in International Patent Application No. PCT/GB2014/050417.

Ferrar et al; "Gas flow effects on selective laser melting (SLM) manufacturing performance;" Journal of Materials Processing Technology, Elsevier, NL; Sep. 26, 2011; vol. 212; No. 2; pp. 355-364.

Abe et al; "Influence of forming conditions on the titanium model in rapid prototyping with the selective laser melting process;" Proceedings of the Institution of Mechanical Engineers, Part C, Journal of Mechanical Engineering Science; Mechanical Engineering Publications; Jan. 1, 2003; vol. 217; No. 1; pp. 119-126.

U.S. Appl. No. 14/766,627, filed Aug. 7, 2015 in the name of Dimter et al.

S. Dadbakhsh et al, "Effect of selective laser melting layout on the quality of stainless steel parts", Rapid Prototyping Journal, vol. 18, Issue 3, pp. 241-249.

Oct. 8, 2015 International Preliminary Report on Patentability and Written Opinion issued in PCT/EP2014/056323.

Search Report issued in British Application No. GB1303920.1 issued Apr. 8, 2013.

Jun. 14, 2016 Office Action issued in Chinese Patent Application No. 201480020782.3.

May 27, 2016 Office Action issued in Chinese Patent Application No. 201480020930.1.

* cited by examiner

SELECTIVE LASER SOLIDIFICATION APPARATUS AND METHOD

The present invention relates to selective laser solidification and in particular to an improved selective laser melting process and apparatus in which an order in which objects or parts of objects are built is selected based on a direction of gas flow.

BACKGROUND

Additive manufacturing or rapid prototyping methods for producing objects comprise layer-by-layer solidification of a material, such as a metal powder material, using a laser beam. A powder layer is deposited on a powder bed in a build chamber and a laser beam is scanned across portions of the powder layer that correspond to a cross-section of the object being constructed. The laser beam melts or sinters the powder to form a solidified layer. After selective solidification of a layer, the powder bed is lowered by a thickness of the newly solidified layer and a further layer of powder is spread over the surface and solidified, as required. In a single build, more than one object can be built, the objects spaced apart in the powder bed.

During the melting or sintering process, debris (e.g. condensate, unsolidified particles of powder etc) is produced within the build chamber. It is known to introduce a gas flow through the build chamber in an attempt to remove debris from the chamber in the gas flow. For example, the M280 model of machine produced by EOS GmbH, Munich, Germany comprises a series of gas outlet nozzles located to the rear of the powder bed that pass a flow of gas to a series of exhaust vents that are located at the front of the powder bed. In this manner, a planar layer of gas flow is created at the surface of the powder bed. A similar arrangement is provided in Renishaw's AM250 and AM125 machines, wherein apertures at either side of a powder bed provide substantially planar gas flow across the powder bed. It has been found that debris can be blown from one section of an object to another section of the object or to another object. This can result in non-uniformity and increased porosity of the solidified metal layers generated by the melting process. In particular, debris blown across the powder bed can result in an increase in surface roughness such that pores are formed between adjacent layers. Non-uniformities in a build can result in an object not conforming to the desired design and damage the apparatus. In particular, a wiper blade is typically used to spread each powder layer across the powder bed. Solidified structures that project out of the powder bed can catch on and cause damage to the wiper blade. Damaged wiper blades may result in powder layers with ridges of powder. Accordingly, non-uniformities in a build may be a concern not just for the layer being formed, but powder layers formed thereafter.

SUMMARY OF INVENTION

According to a first aspect of the invention there is provided a selective laser solidification apparatus, comprising; a powder bed onto which a powder layer can be deposited, a gas flow unit for passing a flow of gas over the powder bed along a gas flow direction, a laser scanning unit for scanning a laser beam over the powder layer to selectively solidify at least part of the powder layer to form one or more objects and a processing unit for selecting a scanning sequence of the laser beam based on the gas flow direction.

The scanning sequence may be selected such that debris produced by the scan is carried away from areas of the powder layer which are yet to be scanned. In this way, these areas of powder are not disturbed and contaminated by the debris ensuring that, when these areas are solidified, the solidified layer is built to a desired, uniform height. For example, the processing unit may select to scan one area before another area because the area is located downwind in the gas flow direction of the other area. Debris produced in forming the upwind area may be blown onto the already formed downwind area but this debris may be removed by the wiper and, if not removed, covered by the next powder layer to be remelted when forming the next cross-section. Accordingly, scanning areas in this order is less likely to result in non-uniformities in the build.

The one or more objects may be formed through the solidification of separate islands in at least one powder layer, the processing unit arranged to select an order in which islands are formed based upon the relative location of the islands in the at least one powder layer and the gas flow direction.

The order in which islands are formed may be selected such that debris produced by forming an island is carried away from areas of the powder layer in which islands are yet to be formed. In this way, these areas of powder are not disturbed and contaminated by the debris ensuring that, when these areas are solidified, the solidified layer is built to a desired, uniform height. For example, the processing unit may select to form at least part of an island before at least part of another island because the at least part of the island is located downwind in the gas flow direction of at least part of the other island. Debris produced in forming the upwind island may be blown onto the already formed downwind island but this debris will be covered by the next powder layer and the debris is likely to be remelted when forming the next cross-section. Accordingly, building the islands in this order is less likely to result in non-uniformities in the build.

For islands wherein a first island is located wholly downwind of a second island, the processing unit may be arranged to select to form the first island completely before forming the second island. However, if a first island is located to at least partially surround a second island such that parts of the first island are downwind and other parts of the first island are upwind of the second island, the processing unit may be arranged to select to form at least part of the second island in between forming the downwind and upwind parts of the first island.

The processing unit may determine an order in which areas should be scanned by projecting a debris fallout zone that would be created when solidifying each area and determining whether one or more other areas to be solidified fall within the debris fallout zone, the processing unit selecting to solidify the one or more other areas that fall within the debris fallout zone before solidifying the area from which the debris fallout zone has been projected. The debris fallout zone may be projected as a pair of parallel lines extending in the gas flow direction from outmost edges of the area in a direction perpendicular to the gas flow direction. Such a debris fallout zone may be suitable when the gas flow is a laminar gas flow (Reynolds number less than 2000). However, it may also be desirable to project the debris fallout zone as diverging lines at a slight angle to the gas flow direction to take into account slight turbulence in the gas flow that may cause the debris to be deposited beyond the outmost edges of the area in a direction perpendicular to the gas flow direction. More complex models of the region over which debris may be deposited may be used requiring more complex projections of the debris fallout zone. For example, areas to be solidified that are located close to an edge of the powder bed may be subjected to more turbulent flow because these areas are closer to the sidewalls of a build chamber than areas located centrally in the powder bed.

The apparatus may comprise an interface for the user to identify the one or more objects to be formed. The user may select the locations on a build platform where the one or more objects are to be built. Alternatively, the processing unit may be arranged to select the locations on a build platform for the one or more objects. The processor may select the location for one or more of the objects based upon the debris fallout zone of an object whose location has already been selected.

According to a second aspect of the invention there is provided a method of selecting a scanning sequence of a laser beam in a selective laser solidification process, in which one or more objects are formed layer-by-layer by, repeatedly, depositing a layer of powder on a powder bed and scanning a laser beam over the deposited powder to selectively solidify at least part of the powder layers, wherein a gas flow is passed over the powder bed in a gas flow direction, the method comprising selecting a scanning sequence of the laser beam based on the gas flow direction.

The method may be a computer-implemented method.

According to a third aspect of the invention there is provided a data carrier having instructions stored thereon, the instructions, when executed by a processor, cause the processor to carry out the method of the second aspect of the invention.

According to a fourth aspect of the invention there is provided apparatus for selecting a scanning sequence of a laser beam in a selective laser solidification process, in which one or more objects are formed layer-by-layer by, repeatedly, depositing a layer of powder on a powder bed and scanning a laser beam over the deposited powder to selectively solidify at least part of the powder layers, wherein a gas flow is passed over the powder bed in a gas flow direction, the apparatus comprising a processing unit, a display and a user input device, the processing unit arranged to receive data on one or more objects, including a location of the objects on a build platform, cause the display to display an image of areas to be solidified, wherein a debris fallout zone is projected from each area, and receive a user input from the user input device of an order in which the areas are to be scanned.

According to a fifth aspect of the invention there is provided a data carrier for selecting a scanning sequence of a laser beam in a selective laser solidification process, in which one or more objects are formed layer-by-layer by, repeatedly, depositing a layer of powder on a powder bed and scanning a laser beam over the deposited powder to selectively solidify at least part of the powder layers, wherein a gas flow is passed over the powder bed in a gas flow direction, the data carrier having instructions thereon, which, when executed by a processor, cause the processor to receive data on one or more objects, including a location of the objects on a build platform, cause a display to display an image of areas to be solidified, wherein a debris fallout zone is projected from each area, and receive a user input from a user input device of an order in which the areas are to be scanned.

The data carrier of the above aspects of the invention may be a suitable medium for providing a machine with instructions such as non-transient data carrier, for example a floppy disk, a CD ROM, a DVD ROM/RAM (including −R/−RW and +R/+RW), an HD DVD, a Blu Ray™ disc, a memory (such as a Memory Stick™, an SD card, a compact flash card, or the like), a disc drive (such as a hard disk drive), a tape, any magneto/optical storage, or a transient data carrier, such as a signal on a wire or fiber optic or a wireless signal, for example a signals sent over a wired or wireless network (such as an Internet download, an FTP transfer, or the like).

DESCRIPTION OF THE DRAWINGS

Embodiments of the invention will now be described, as examples only, with reference to the accompanying drawings, in which.

DESCRIPTION OF EMBODIMENTS

Figure 1:
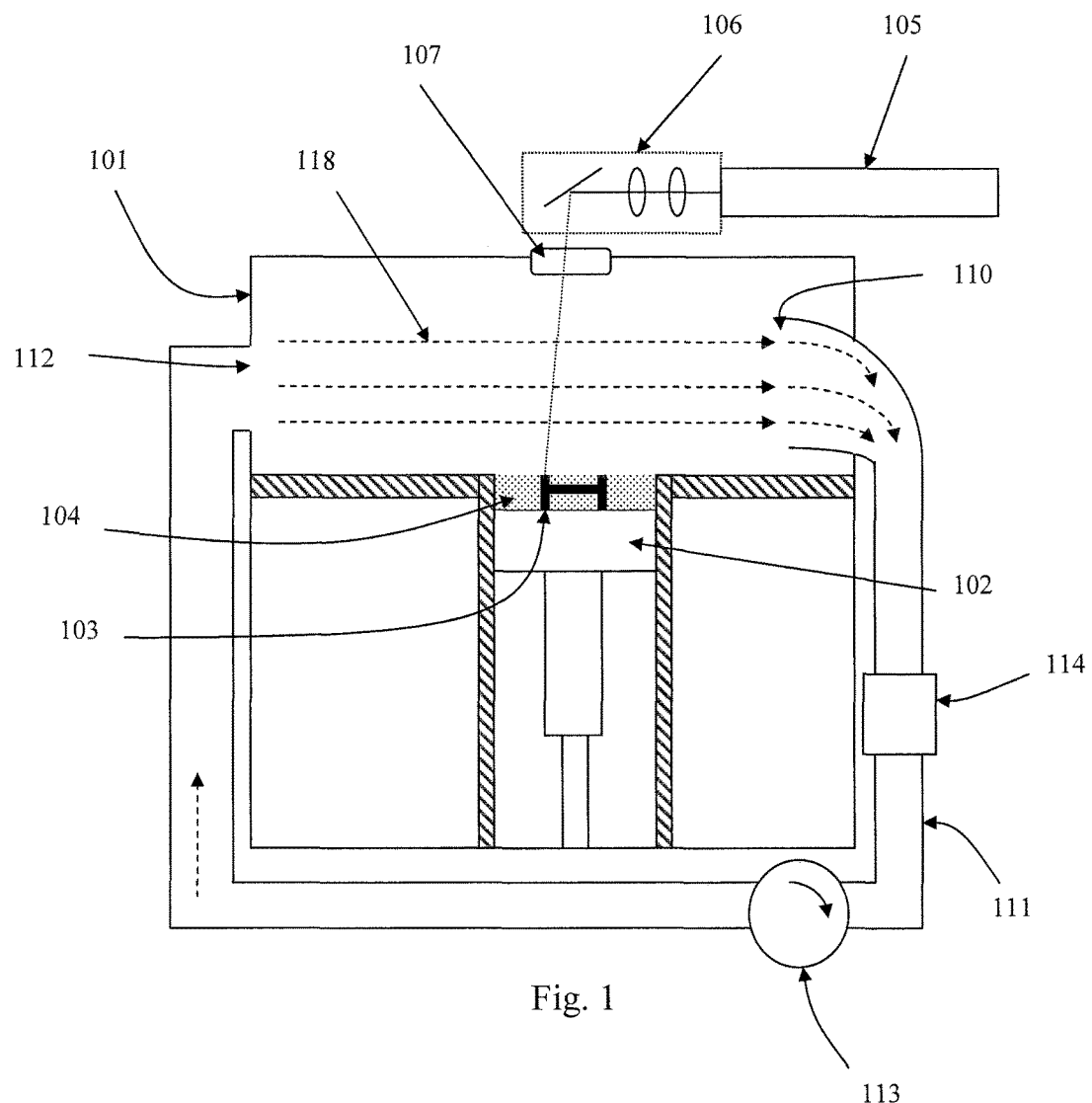
FIG. 1 is a schematic view of a laser solidification apparatus according to one embodiment of the invention.
Figure 2:
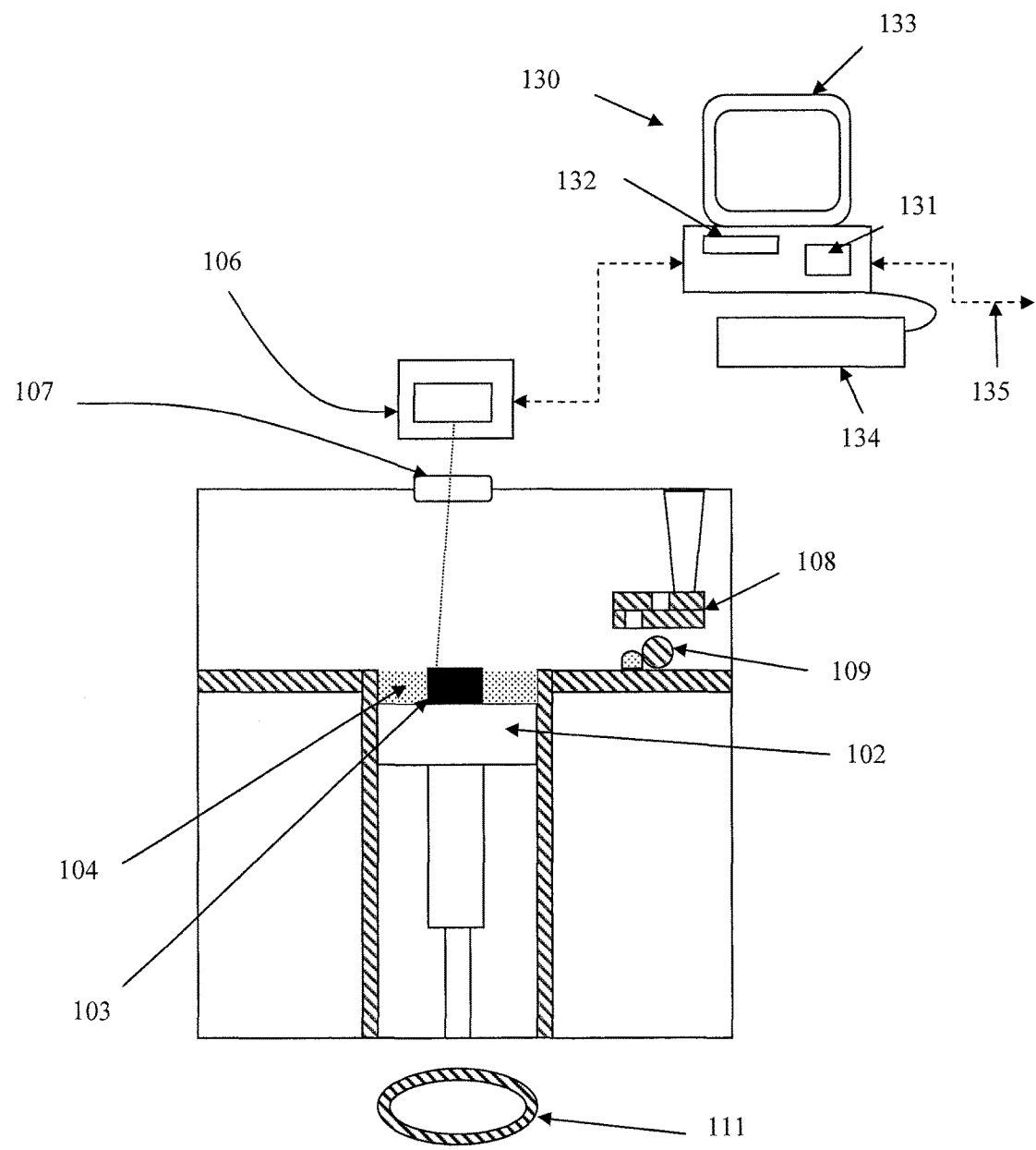
FIG. 2 is a schematic view of the laser solidification apparatus from another side.

Referring to FIGS. 1 and 2, a laser solidification apparatus according to an embodiment of the invention comprises a build platform 102 for supporting an object 103 built by selective laser melting powder 104. The platform 102 can be lowered in the chamber 101 as successive layers of the object 103 are formed. Layers of powder 104 are formed as the object 103 is built by dispensing apparatus 108 and a wiper 109. For example, the dispensing apparatus 108 may be apparatus as described in WO2010/007396. A laser module 105 generates a laser for melting the powder 104, the laser directed as required by optical module 106 under the control of a computer 130. The laser enters the build chamber via a window 107.

An inlet 112 and outlet 110 are arranged for generating a gas flow across the powder bed formed on the build platform 102. The inlet 112 and outlet 110 are arranged to produce a laminar flow having a flow direction from the inlet to the outlet, as indicated by arrows 118. Gas is re-circulated from the outlet 110 to the inlet 112 through a gas recirculation loop 111. A pump 113 maintains the desired gas pressure at inlet 112 and openings 5, 6. A filter 114 is provided in the recirculation loop 111 to filter from the gas condensate that has become entrapped in the flow. It will be understood that more than one inlet 112 may be provided in the build chamber 101. Furthermore, rather than extending outside of the build chamber 101, the recirculation loop 111 may be contained within the build chamber 101.

Computer 130 comprises a processor unit 131, memory 132, display 133, user input device 134, such as a keyboard, touch screen, etc, a data connection to modules of the laser sintering unit, such as optical module 106 and laser module 105, and an external data connection 135. Stored on memory 132 is a computer program that instructs the processing unit to carry out the method described with reference to FIGS. 3 to 5.

Figure 3:
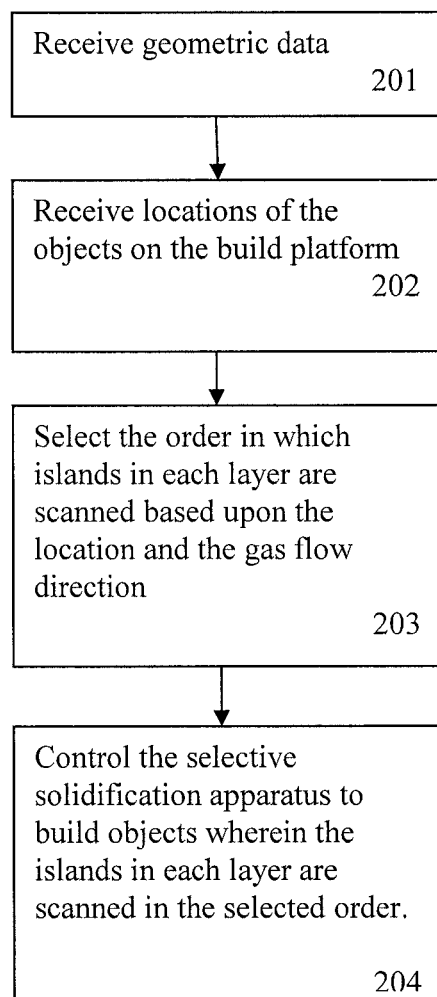
FIG. 3 is a flowchart showing the steps of a method according to the invention.

Referring to FIG. 3, geometric data of objects to be built, such as in the form of an STL file, are received 201 by the computer 130, for example over the external data connection 135. The processing unit 131 receives 202 information on the location of the objects on the build platform 102. This location information may already be defined in the STL or the user may the select, using the user input device 135, where each object should be located on the build platform 102. For each layer, the processing unit 131 identifies areas of the layer that are to be solidified and determines 203 an order in which these areas should be scanned by the laser beam. An example of how this may be done is shown in FIG. 4.

Figure 4:
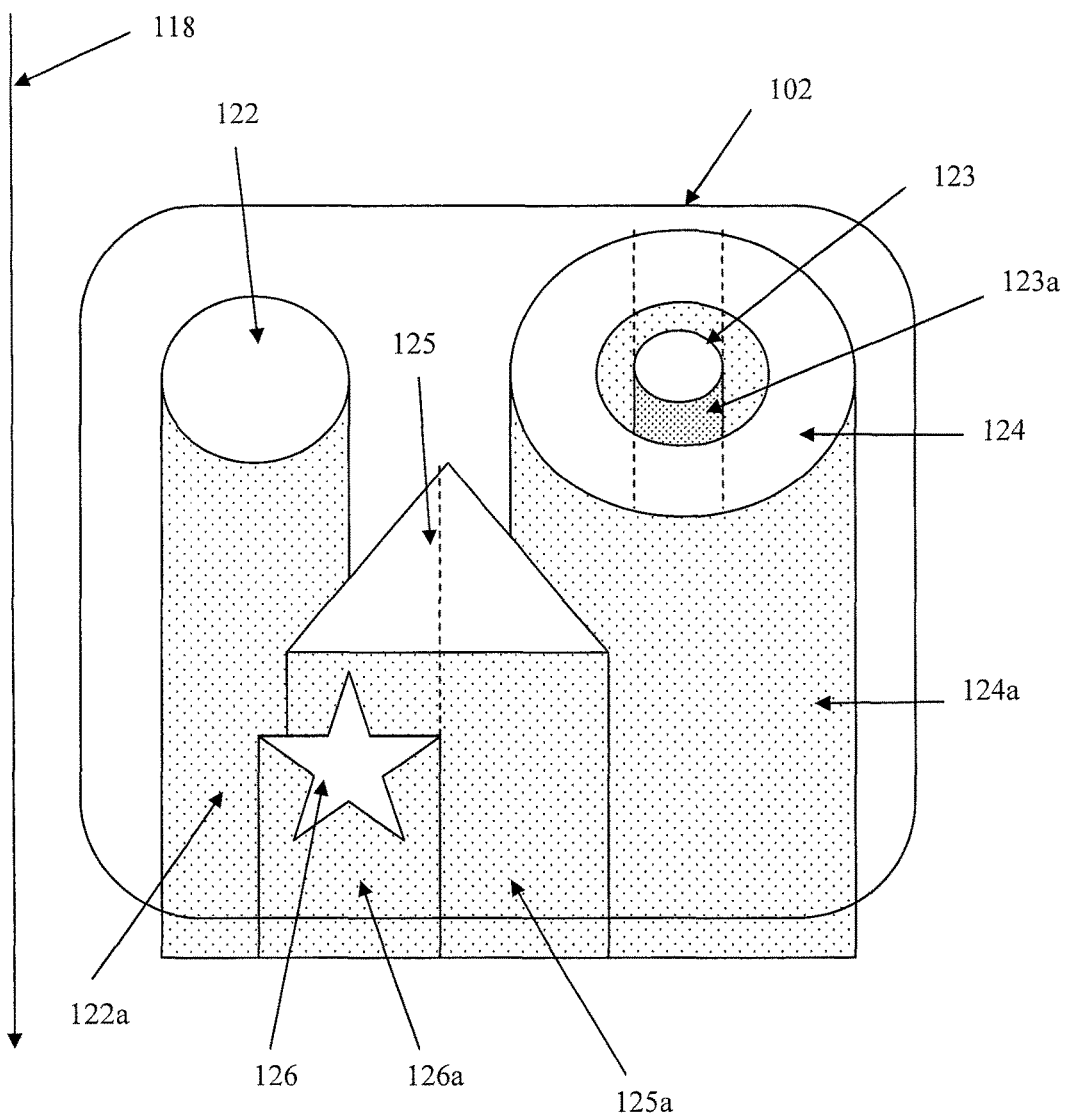
FIG. 4 is a plan view of islands to be solidified on a build platform of the apparatus, wherein debris fallout zones have been projected.

FIG. 4 shows five separate areas (islands) 122 to 126 to be solidified for a particular layer. For each island 122 to 126, the processing unit projects a debris fallout zone 122a to 126a in a gas flow direction from the island. The processing unit 131 then determines, for each island 122 to 126, if any other island falls within the debris fallout zone. If so, the processing unit selects to form this other island before forming the island for which the debris fallout zone was determined. For example, in FIG. 4, islands 125 and 126 fall within the fallout zone of island 122 and therefore, are selected to be scanned before island 122. Island 126 also falls within the fallout zone of island 125 and therefore, should be formed before island 125.

Rather than restricting ordering of the build to a complete island, the processing unit 131 may be arranged to select to form, in between forming different parts of the island, at least part of another island. FIG. 4 illustrates two examples of this. In the first example, island 123 is completely surrounded by island 124. Accordingly, island 124 comprises parts that are both upwind and downwind of island 123. In such a scenario, the processing unit 131 selects to process the part of the island that is located downwind of island 123 before scanning island 123 and then scans the part of the island 124 that is upwind of island 123. The part of island 124 that is neither upwind nor downwind of island 123 may be scanned before or after island 123 and the selection of the scanning order of these parts may be based on other criteria, such as scan speed. The different parts of island 124 are illustrated by the dotted lines. In the second example, rather than scanning all of island 125 after scanning island 126, the part of island 125 that is not upwind of island 126 may be scanned before island 126. There may be reasons for scanning part of island 125 ahead of island 126, such as to optimize scan speed, variations in material composition and/or focal position.

In this embodiment, the processing unit 131 carries out this process for each layer. However, in another embodiment, rather than calculating a scanning order for each layer, it may be possible to determine an order for multiple layers from a single analysis. For example, a fallout zone could be determined from a footprint of each object on the build platform 102, the order being determined based upon whether other objects fall within a debris fallout zone calculated based on this footprint. Even though for some layers the debris fallout zone may be smaller than that calculated from the footprint, such a method may provide a reasonable generalization that reduces the amount of processing required in determining an order in which the parts should be built.

The selected order of scanning the parts may be displayed to the user and the user may be able to change the order. The user can then activate the build to cause the processing unit to control 204 the optical module 106 and laser module 105 to scan the powder layers to form the islands in the selected order.

Figure 5:
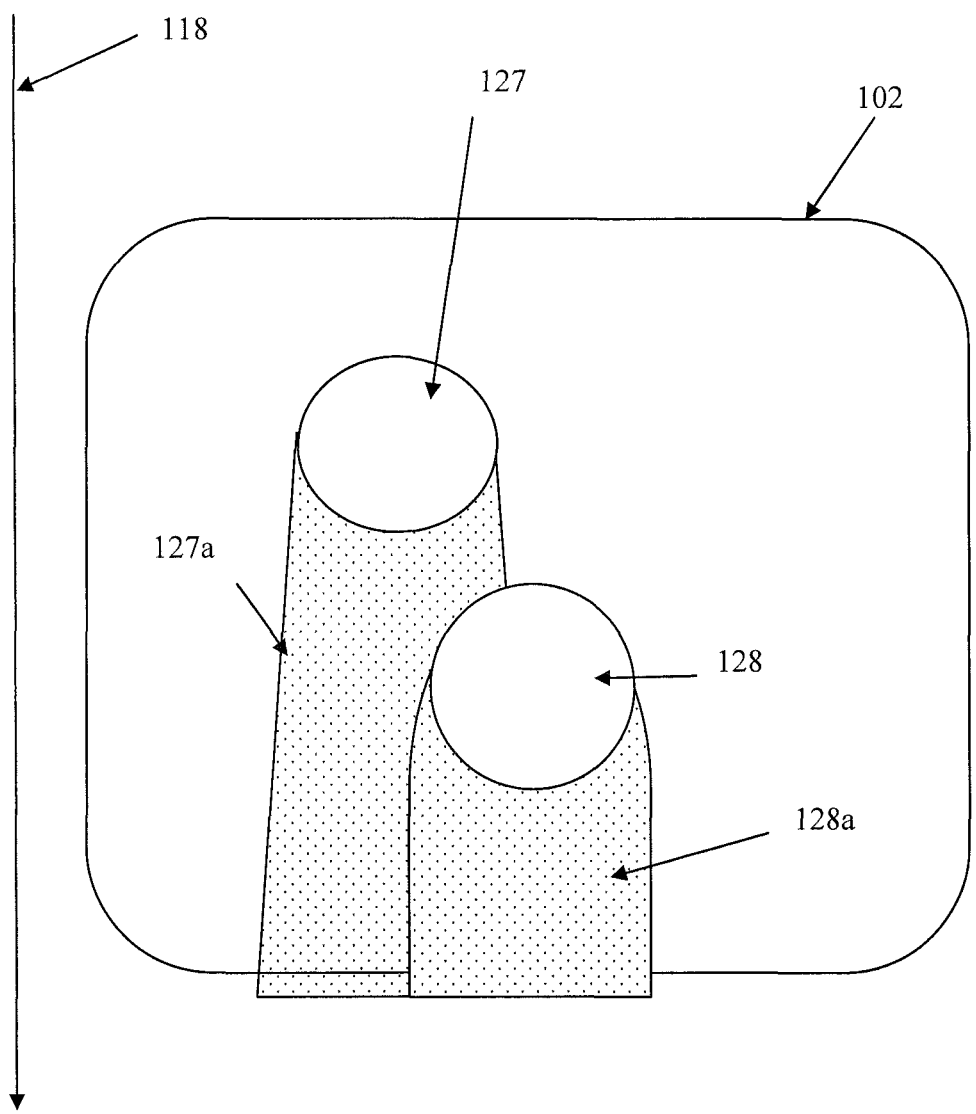
FIG. 5 is a plan view of islands to be solidified on a build platform of the apparatus, wherein debris fallout zones according to a different embodiment of the invention have been projected.

In the embodiment shown in FIG. 4, the debris fallout zones are projected by extending straight lines in the gas flow direction from edges of the islands. However, other projections of the fallout zones could be used. Two examples are shown in FIG. 5. For island 127, a fallout zone 127a is projected as diverging straight lines at a slight angle to the gas flow direction to take into account slight turbulence in the gas flow that may cause the debris to be deposited beyond the outmost edges of the island in a direction perpendicular to the gas flow direction. A similar principal is embodied by island 128 and fallout zone 128a, where an initially curved border to the fallout zone is used to model that locally debris may be thrown out by the impact of the laser beam on the powder layer but further from the island the debris is more likely to be carried away along a straighter path by the gas flow.

In a further embodiment, rather than the processing unit selecting the order in which islands are scanned, a user may select an order in which islands are built. This may be achieved by the processing unit 131 causing the display 133 to display images similar to those shown in FIGS. 4 and 5 so that the user can select the order islands are scanned based upon this visualisation of the fallout zones. The processing unit 131 then receives user inputs from the user input device of the order in which islands should be scanned.

It will be understood that in the above description, the islands may come together in earlier or later layers so as to form a single object or may remain separate so as to form one or more separate objects.

It will be understood that alterations and modifications may be made to the invention without departing from the scope of the invention as defined herein. For example, the invention could be applied to a single island, wherein it is desirable to scan a downwind part of the island ahead of scanning an upwind part of the island.

The invention claimed is:

1. A selective laser solidification apparatus, comprising:
 a build carrier for supporting a powder bed onto which a powder layer can be deposited;
 a gas flow unit for passing a flow of gas over the powder bed along a gas flow direction;
 a laser scanner for scanning a laser beam over the powder layer to selectively solidify at least part of the powder layer to form one or more objects; and
 a processor for selecting a scanning sequence of the laser beam based on the gas flow direction.

2. A selective laser solidification apparatus according to claim 1, wherein the processor is arranged to select the scanning sequence such that debris produced during a scan of the laser beam in accordance with the scanning sequence is carried away from areas of the powder layer which are yet to be scanned.

3. A selective laser solidification apparatus according to claim 1, wherein the processor is arranged to select the scanning sequence such that a first area is scanned before a second area, the first area being located downwind in the gas flow direction of the second area.

4. A selective laser solidification apparatus according to claim 1, wherein:
 the one or more objects are formed through solidification of separate islands in the powder layer, and
 the processor is arranged to select an order in which the separate islands are formed based upon (i) relative location of the separate islands in the powder layer and (ii) the gas flow direction.

5. A selective laser solidification apparatus according to claim 4, wherein the order in which the separate islands are formed is selected such that debris produced by forming a first one of the separate islands is carried away from an area of the powder layer in which a second one of the separate islands is to be formed.

6. A selective laser solidification apparatus according to claim 4, wherein the processor is arranged to select the scanning sequence such that at least part of a first island of the separate islands is formed before at least part of a second island of the second islands, the at least part of the first island being located downwind in the gas flow direction of the at least part of the second island.

7. A selective laser solidification apparatus according to claim 4, wherein, for an arrangement of the separate islands in which a first island of the separate islands is located wholly downwind of a second island of the separate islands, the processor is arranged to select to form the first island completely before forming the second island.

8. A selective laser solidification apparatus according to claim 4, wherein, if a first island of the separate islands is located to at least partially surround a second island of the separate islands such that a first part of the first island is downwind and a second part of the first island is upwind of the second island, the processor is arranged to select to form at least part of the second island in between forming the first and second parts of the first island.

9. A selective laser solidification apparatus according to claim 1, wherein the processor is arranged to determine an order in which a plurality of areas of the powder layer should be scanned by projecting a debris fallout zone that would be created when solidifying a first area of the plurality of areas and determining whether a second area of the plurality of areas to be solidified falls within the debris fallout zone, the processor selecting to solidify at least a part of the second area that falls within the debris fallout zone before solidifying the first area.

10. A selective laser solidification apparatus according to claim 1, wherein the processor is arranged to select a location on the build platform for one of the objects, the processor selecting the location based upon a debris fallout zone that would be created when solidifying a second one of the objects whose location on the build platform has already been selected.

11. A selective laser solidification apparatus according to claim 1, wherein the processor is arranged to select the scanning sequence for the laser beam such that areas of the powder layer are progressively solidified in a direction opposed to the gas flow direction.

12. A processor for use with a selective laser solidification apparatus that comprises (i) a build platform for supporting a powder bed onto which a powder layer can be deposited, (ii) a gas flow unit comprising a gas inlet and a gas outlet located to generate a flow of gas over the powder bed in a gas flow direction, and (iii) a laser scanner for scanning a laser beam over the powder layer to selectively solidify at least part of the powder layer, the processor being arranged to:
receive geometric data defining at least one object to be built using the selective laser solidification apparatus;
select a scanning sequence of the laser beam to form the at least one object based on the gas flow direction; and
generate instructions for controlling the selective laser solidification apparatus to build the at least one object based upon the scanning sequence.

13. A selective laser solidification apparatus, comprising:
a build platform for supporting a powder bed onto which a powder layer can be deposited;
a gas flow unit comprising a gas inlet and a gas outlet located to generate a flow of gas over the powder bed in a gas flow direction;
a laser scanner for scanning a laser beam over the powder layer to selectively solidify at least part of the powder layer to form one or more objects; and
a processor arranged to select a scanning sequence for the laser beam based on the gas flow direction.

14. A selective laser solidification apparatus according to claim 13, wherein the processor is arranged to select the scanning sequence for the laser beam such that areas of the powder layer are progressively solidified in a direction opposed to the gas flow direction.

15. A selective laser solidification apparatus, comprising:
a build platform for supporting a powder bed onto which a powder layer can be deposited;
a gas inlet and a gas outlet, a gas flow direction being defined by a location of the gas inlet and the gas outlet;
an optical module comprising steerable optics for scanning a laser beam over the powder layer to selectively solidify at least part of the powder layer to form one or more objects; and
a processor arranged to select a scanning sequence for the laser beam based on the gas flow direction.

16. A selective laser solidification apparatus according to claim 15, wherein the processor is arranged to select the scanning sequence for the laser beam such that areas of the powder layer are progressively solidified in a direction opposed to the gas flow direction.

* * * * *